United States Patent [19]

Patsiokas et al.

[11] Patent Number: 5,392,331
[45] Date of Patent: Feb. 21, 1995

[54] METHOD AND APPARATUS FOR PERFORMING A HAND-OFF IN A WIRELESS COMMUNICATION SYSTEM

[75] Inventors: Stelios J. Patsiokas, Plantation; Craig Wadin, Sunrise; Paul Marko, Ft. Lauderdale; Prathivadhi B. Krishna, Boynton Beach, all of Fla.

[73] Assignee: Motorola, Inc., Schaumburg, Ill.

[21] Appl. No.: 252,139

[22] Filed: May 31, 1994

Related U.S. Application Data

[63] Continuation of Ser. No. 935,494, Aug. 25, 1992, abandoned.

[51] Int. Cl.⁶ .................... H04M 11/00; H04Q 7/00
[52] U.S. Cl. ........................................ 379/63; 379/60; 379/59; 455/33.2
[58] Field of Search ................ 379/63, 58, 60, 59; 455/33.2, 34.1, 34.2, 51.1, 56.1, 54.1

[56] References Cited

U.S. PATENT DOCUMENTS

| | | | |
|---|---|---|---|
| 3,764,747 | 10/1973 | Nakajima et al. | 379/63 |
| 3,906,166 | 9/1975 | Cooper et al. | 379/59 |
| 4,654,867 | 3/1987 | Labedz et al. | 379/63 |
| 5,148,548 | 9/1992 | Meche et al. | 455/62 |
| 5,175,867 | 12/1992 | Wejke et al. | 379/60 |
| 5,203,012 | 4/1993 | Patsiokas et al. | 379/60 |
| 5,239,676 | 8/1993 | Strawezynski et al. | 455/33.2 |
| 5,243,653 | 9/1993 | Malek et al. | 379/59 |

OTHER PUBLICATIONS

European Telecommunications Standards Institute, "CT2 Common Air Interface," Version 1.1, all pages, Jun. 30, 1991, United Kingdom.

Mitel Corporation, "Microelectronics Digital Communications Handbook," Issue 8, pp. 9-65 through 9-82, Canada.

*Primary Examiner*—Curtis Kuntz
*Assistant Examiner*—Michael B. Chernoff
*Attorney, Agent, or Firm*—R. Louis Breeden

[57] ABSTRACT

A method and apparatus in a digital wireless communication system (100) controls an inter-cell hand-off. First and second fixed units (102) receive a common synchronization signal from a controller (104), and a first wireless link is established between the first fixed unit and a portable unit (120) on a first frequency. The first wireless link is synchronized to the common synchronization signal, and frame synchronization is obtained between the fixed unit (102) and the portable unit (120) during establishment of the first wireless link. Frame synchronization is maintained only by maintaining bit synchronization while transmitting user data on the first frequency. A second wireless link is established between the second fixed unit (102) and the portable unit (120) on the first frequency if the first frequency is usable therebetween. The second wireless link is synchronized to the common synchronization signal. The first wireless link is disconnected after the second wireless link is established, thereby seamlessly completing the inter-cell hand-off.

18 Claims, 6 Drawing Sheets

METHOD AND APPARATUS FOR PERFORMING A HAND-OFF IN A WIRELESS COMMUNICATION SYSTEM

This is a continuation of application Ser. No. 07/935,494, filed on Aug. 25, 1992, now abandoned.

CROSS-REFERENCE TO RELATED APPLICATIONS

Application No. 07/833,281, filed Feb. 10, 1992, now abandoned by Patsiokas et al., entitled "Method and Apparatus for Optimum Channel Assignment."

FIELD OF THE INVENTION

This invention relates in general to wireless communication systems, and more specifically to wireless communication systems having the capability of handing-off a portable communication unit from a first fixed communication unit to a second fixed communication unit.

BACKGROUND OF THE INVENTION

Two-way radio communication systems that support hand-off are well known in the art. An example of such a system is a cellular mobile telephone system. Other systems such as those based on the Digital European Cordless Telecommunications (DECT) standard have been proposed and are under development by equipment vendors around the world.

Conventional analog radio communication systems that have a plurality of radio coverage areas defined by a limited transmission distance of a fixed communication unit in each of the radio coverage areas use a controller to support hand-off. Whenever a need for handing-off a first portable communication unit is determined by a first fixed communication unit handling a call with the first portable communication unit, the controller commands other fixed communication units near the first fixed communication unit to measure the received signal strength of the first portable communication unit on a transmission channel on which the first portable communication unit is transmitting. To avoid a possibility of erroneously measuring a signal transmitted from a second portable communication unit, the identity of the portable communication unit transmitting the received signal also must be determined.

Digital communication systems based on second generation cordless telephony (CT2) technology are becoming popular. A problem exists in executing a hand-off in the conventional CT2 system, because only a fixed communication unit that has established a link with a portable communication unit can identify the portable communication unit. Other fixed communication units can measure the strength of a signal present on a channel that the portable communication unit is known to be using, but cannot confirm that the signal is coming from the "correct" portable communication unit. Worse yet, because the CT2 system is a time-division-duplex system, it is equally likely that a monitored signal may be coming from another fixed communication unit.

The cause of the identification problem is that in the conventional CT2 system there is no frame synchronization information transmitted while transmitting user data, e.g., voice communications. As a consequence, there is no way for a monitoring fixed communication unit to synchronize with and identify the source of a monitored signal. A fixed communication unit that originally establishes a link with a portable communication unit does not have a synchronization problem, because by maintaining bit synchronization with the fixed-bit-rate signals of CT2, the fixed communication unit also maintains frame synchronization obtained during link establishment.

Even if the source of the monitored signal could be positively identified, a seamless hand-off would not be possible in the conventional CT2 system. This is because the conventional CT2 system provides no way of establishing a new wireless link for accepting the hand-off without noticeably interrupting the transmission of user communications.

Thus, what is needed is a way of performing a hand-off in a CT2 system that allows confirmation of the source of a signal while monitoring the signal to select the best fixed communication unit for receiving the hand-off. Also needed is a way of doing a seamless hand-off. Whenever a seamless hand-off is not possible, then at least a way of doing a hand-off that reduces interruption of user communications to a negligibly brief duration is needed.

SUMMARY OF THE INVENTION

An aspect of the present invention is a method in a digital wireless communication system for controlling an inter-cell hand-off of a wireless link from a first fixed communication unit to a second fixed communication unit. The system comprises a portable communication unit and a controller coupled to the first and second fixed communication units. The method comprises the steps of receiving by the first and second fixed communication units a common master synchronization signal from the controller, and establishing a first wireless link between the first fixed communication unit and the portable communication unit on a first radio frequency. The first wireless link is synchronized to the common master synchronization signal, and .frame synchronization is obtained between the fixed communication unit and the portable communication unit during establishment of the first wireless link. The method further comprises the step of maintaining said frame synchronization by maintaining bit synchronization while transmitting user data on the first radio frequency. No frame synchronization information is transmitted while transmitting the user data. The method also includes the step of establishing, under direction of the controller, a second wireless link between the second fixed communication un, it and the portable communication unit. The second wireless link is established on the first radio frequency in response to the first radio frequency having been determined by the system to be usable therebetween. The second wireless link is synchronized to the common master synchronization signal. In addition, the method includes the step of disconnecting the first wireless link, after the step of establishing the second wireless link, under direction of the controller, thereby seamlessly completing the inter-cell hand-off.

Another aspect of the present invention is an apparatus for use in a digital wireless communication system for controlling an inter-cell hand-off of a wireless link from a first fixed Communication unit to a second fixed communication unit. The system comprises a portable communication unit and a controller coupled to the first and second fixed communication units. The apparatus comprises first and second interface elements for receiving, respectively, by the first and second fixed communication units a common master synchronization signal from the controller. The apparatus further comprises a first wireless link establishment element in the first fixed communication unit, coupled to the first interface element, for establishing a first wireless link between the first fixed communication unit and the portable communication unit on a first radio frequency. The first wireless link is synchronized to the common master synchronization signal, and frame synchronization is obtained between the fixed communication unit and the portable communication unit during establishment of the first wireless link. The frame synchronization is maintained by maintaining bit synchronization while transmitting user data, and no frame synchronization information is transmitted while transmitting the user data. The apparatus also includes a second wireless link establishment element in the second fixed communication unit, coupled to the second interface means, for establishing under direction of the controller a second wireless link between the second fixed communication unit and the portable communication unit. The second wireless link is established on the first radio frequency in response to the first radio frequency having been determined by the system to be usable therebetween. The second wireless link is synchronized to the common master synchronization signal. In addition, the apparatus includes a first processor element in the first fixed communication unit coupled to the controller for disconnecting the first wireless link in response to establishment of the second wireless link on the first radio frequency, thereby seamlessly completing the intercell hand-off.

DESCRIPTION OF THE PREFERRED EMBODIMENT

Figure 1:
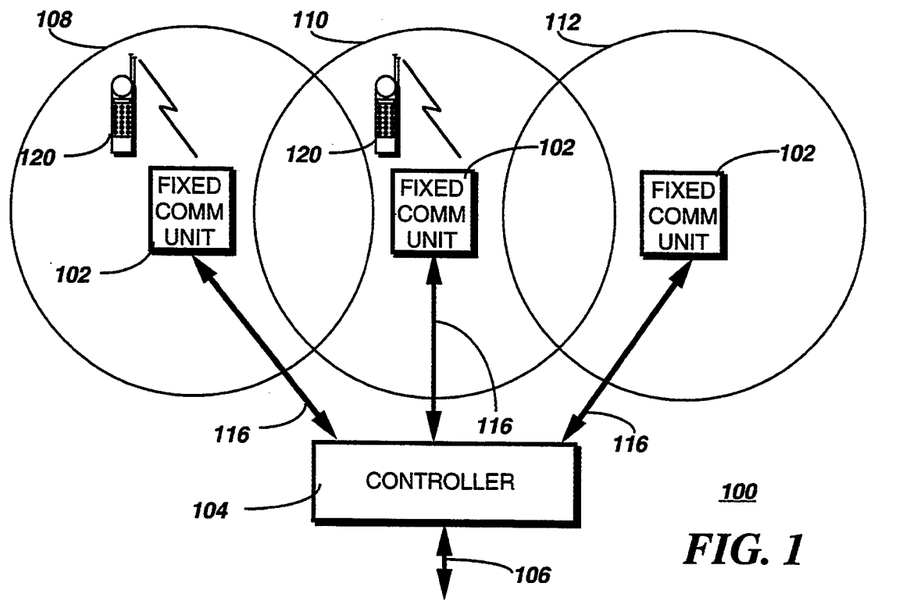
FIG. 1 is a block diagram of a wireless communication system in accordance with the preferred embodiment of the present invention.

With reference to FIG. 1, a block diagram of a wireless communication system 100 in accordance with the preferred embodiment of the present invention comprises a plurality of fixed communication units 102 coupled to a controller 104 by digital connections 116 for transporting user communications. The fixed communication units 102 provide wireless communication coverage within limited coverage areas 108, 110, 112 for portable communication units 120. The controller 104 is coupled to an external telephone system (not shown), e.g., a private branch exchange (PBX) or to the Public Switched Telephone Network (PSTN), by telephone interconnects 106 for transporting telephone calls between the portable communication units 120 and the external telephone system. The controller 104 and the fixed communication units 102 further use the digital connections 116 for communicating control and synchronization information to one another.

Figure 2:
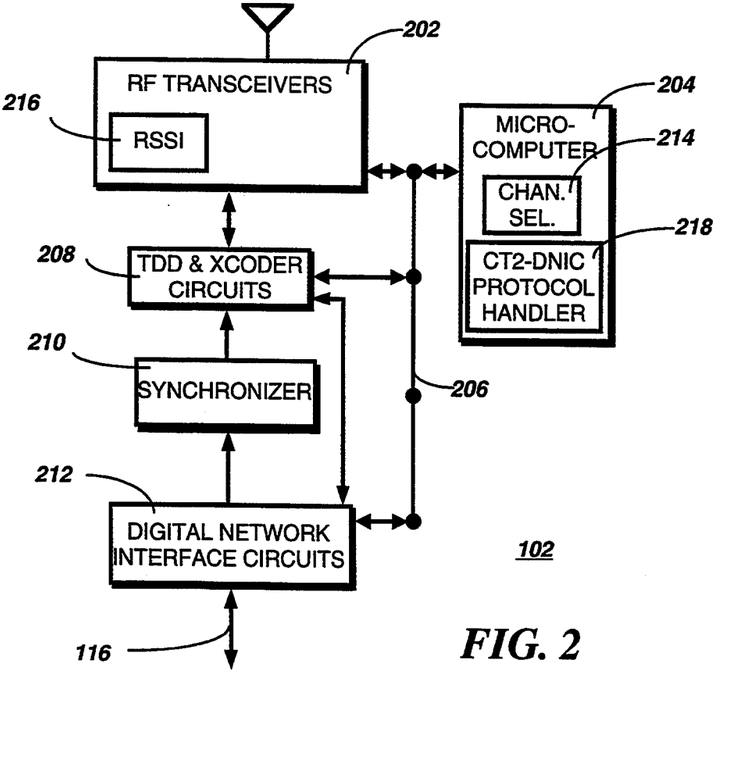
FIG. 2 is a block diagram of a fixed communication unit in accordance with the preferred embodiment of the present invention.

With reference to FIG. 2 a block diagram of the fixed communication unit 102 in accordance with the preferred embodiment of the present invention comprises radio frequency (RF) transceivers 202 coupled to a microcomputer 204 by a bus 206 for controlling the transceivers 202. The RF transceivers 202 comprise a received signal strength indication (RSSI) circuit 216 for indicating the signal strength of a received signal to the microcomputer 204. The fixed communication unit further comprises time division duplex (TDD) and adaptive differential pulse code modulation to pulse code modulation (ADPCM-PCM) transcoder circuits 208 coupled between the RF transceivers 202 and digital network interface circuits (DNICs) 212. The TDD and ADPCM-PCM transcoder circuits 208 are for converting between the ADPCM TDD signaling of the RF transceivers 202 and space-division-duplex PCM interfaces of the DNICs 212. The TDD and ADPCM-PCM transcoder circuits 208 are also coupled to the microcomputer 204 for controlling the TDD and ADPCM-PCM transcoder circuits 208 and to a synchronizer 210 for synchronizing the TDD and ADPCM-PCM transcoder circuits 208. The synchronizer 210 is coupled to the DNICs 212 for receiving synchronization information.

Figure 3:
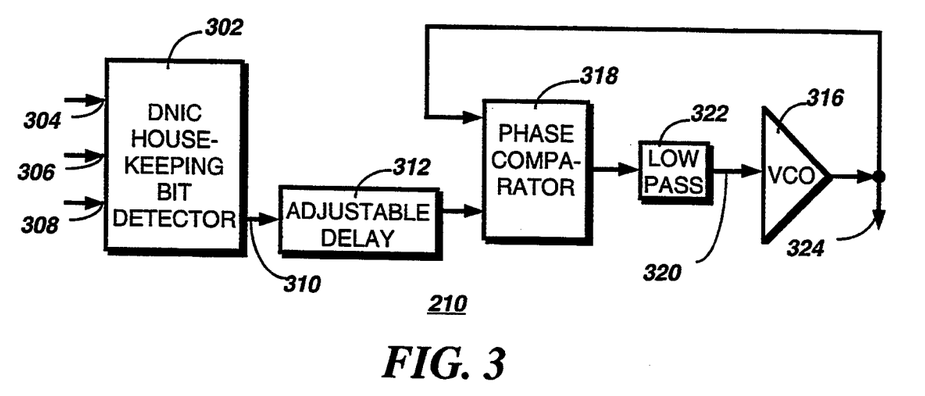
FIG. 3 is a block diagram of a synchronizer in accordance with the preferred embodiment of the present invention.

With reference to FIG. 3 a block diagram of the synchronizer 210 in accordance with the preferred embodiment of the present invention comprises a housekeeping bit detector 302 having a frame sync input 304, a received data input 306, and a received clock input 308. The housekeeping bit detector 302 is a shift register that stores and shifts received data from the DNIC 212 (FIG. 2) coupled to the received data input 306 at a received clock rate from a DNIC received clock port coupled to the received clock input 308. When a frame sync pulse from the DNIC appears at the received data input 306, a bit position corresponding to a housekeeping bit (sent as an alternating 1-0 bit pattern having a repetition rate of five-hundred Hz) is enabled and latched by the housekeeping bit detector 302 and thus appears at a housekeeping bit detector output 310 as a five-hundred Hz square wave.

The five-hundred Hz square wave signal from the housekeeping bit detector output 310 is coupled to an adjustable delay circuit 312 for compensating for differential signal path delay between the controller 104 (FIG. 1) and the fixed communication unit 102. After delay compensation in the adjustable delay circuit 312 the five-hundred Hz square wave signal is coupled to a phase comparator 318 for comparison with a signal comprising an output frequency from an output 324 of a voltage controlled oscillator (VCO) 316. An output signal of the phase comparator 318 is coupled to a low pass filter 322 to produce an error voltage coupled to an input control line 320 of the VCO 316 for controlling frequency and phase of the signal from the VCO output 324. One of ordinary skill in the art will recognize that the phase comparator 318, the low pass filter 322, and the VCO 316 are arranged and connected to comprise a phase-locked loop. Operation of the phase-locked loop is such that the signal from the VCO output 324 is synchronized and phase-locked with the five-hundred Hz square wave signal from the adjustable delay circuit 312.

By transmitting the same housekeeping bit stream from the controller 104 (FIG. 1) to the plurality of fixed communication units 102 (FIG. 1) in accordance with the present invention as is described herein below, the plurality of fixed communication units 102 are synchronized with one another. Furthermore, because in the CT2 system the fixed communication unit 102 provides master synchronization for the portable communication unit 120 (FIG. 1) during link establishment, the portable communication unit 120 advantageously is synchronized with the plurality of fixed communication units 102 that are synchronized with one another. Thus, the plurality of fixed communication units 102 are able to synchronously monitor the transmissions of the portable communication unit 120 for identification and other purposes. This contrasts with the conventional CT2 system, in which the portable communication unit 120 is synchronized with only a single one of a plurality of unsynchronized fixed communication units 102 and cannot be synchronously monitored by the plurality of fixed communication units 102.

Figure 4:
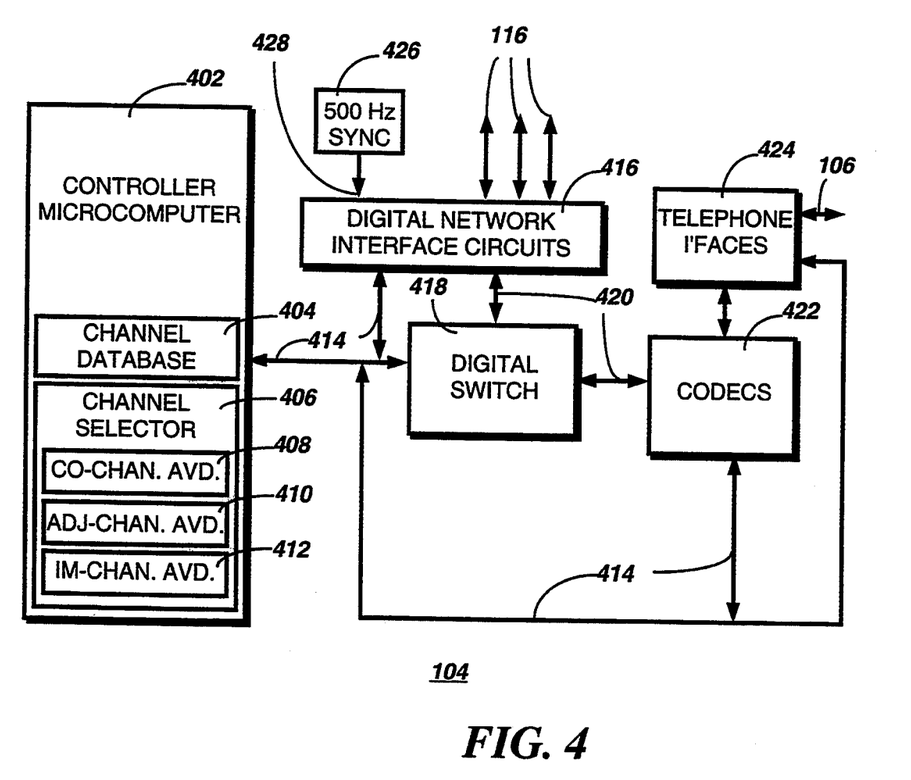
FIG. 4 is a block diagram of a controller in accordance with the preferred embodiment of the present invention.

With reference to FIG. 4, a block diagram of the controller 104 in accordance with the preferred embodiment of the present invention comprises a controller microcomputer 402 comprising a channel database 404 for storing information comprising channel usage and physical location of each of the plurality of fixed communication units 102 (FIG. 1). The controller microcomputer 402 further comprises a channel selector 406 comprising a co-channel avoidance element 408, and adjacent-channel avoidance element 410, and an intermodulation-channel avoidance element 412. The channel selector functions to select channels for hand-off such that interference among the channels of adjacent fixed communication units 102 is minimized.

Interference is minimized by avoiding operation on the same channel or an adjacent channel (same channel ±1) that a physically adjacent fixed communication unit 102 is using. In addition, to minimize interference from intermodulation products, if channel N1 and channel N2 are operating in adjacent fixed communication units, then channel ((2×N1)−N2) and channel ((2×N2)−N1) should be avoided. For example, if channels 3 and 5 are in use in two adjacent fixed communication units, then channels 1 and 7 should be avoided in the two adjacent fixed communication units and in any other fixed communication units near both of the two adjacent fixed communication units.

The controller microcomputer 402 is coupled to a digital switch 418 by a bus 414 for controlling the digital switch 418. Digital telephone switches like the digital switch 418 are well-known in the art, an example being the Meridian One switch manufactured by Northern Telecom Electronics Limited of Nepean, Ontario, Canada. Also coupled to the bus 414 for control are digital network interface circuits (DNICs) 416, a digital switch 418, CODECs 422, and telephone interfaces 424. The DNIC 416 is well-known in the art, an example being the MT8972B DNIC manufactured by Mitel Corporation of Kanata, Ontario, Canada.

The telephone interfaces 424 are coupled to the telephone interconnects 106 for performing well-known functions such as incoming call detection, impedance matching, two-to-four wire conversion, and line supervision. Coupled to the telephone interfaces are the analog interfaces of CODECs 422 for converting between an analog telephone format and a digital format used between the controller 104 and the fixed communication units 102 (FIG. 1). Coupled between digital interfaces of the CODECs 422 and the DNICs 416 by PCM highways 420 is the digital switch 418 for connecting each of the CODECs 422 with up to two of the DNICs 416 simultaneously.

A synchronization generator 426 for generating a five-hundred Hz square wave is coupled to a housekeeping bit input 428 of each of the DNICs 416 for providing a common master synchronization for all the fixed communication units 102 (FIG. 1) controlled by the controller 104. The synchronization generator 426 is itself synchronized with a master clock that also synchronizes all the DNICs, so that transitions of the five-hundred Hz square wave are locked to a frame rate of the DNICs. One of ordinary skill in the art will recognize that there can be other embodiments as well for synchronizing the fixed communication units 102 with one another in accordance with the present invention.

Figure 5:
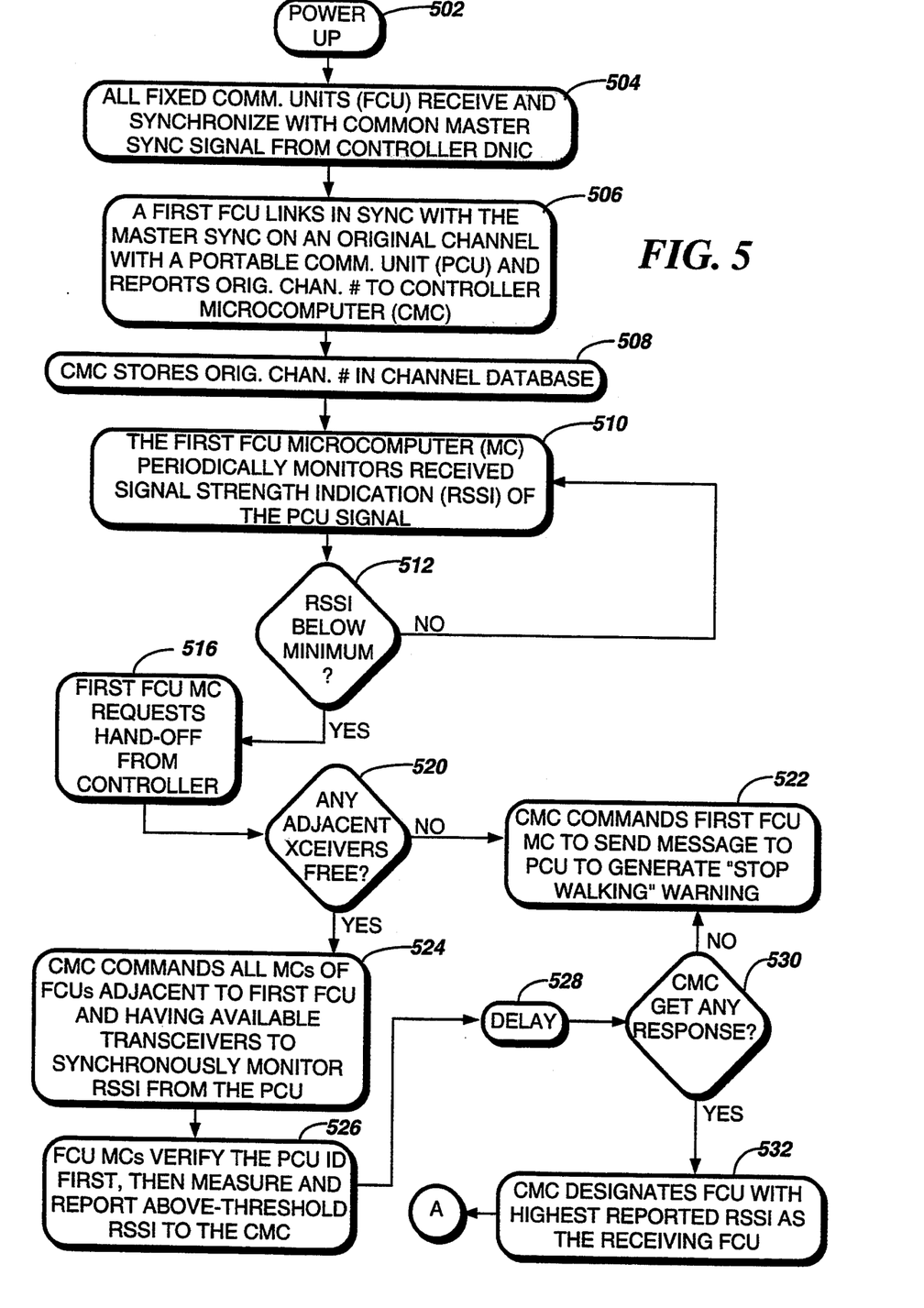
FIGS. 5, 6, and 7 comprise a flow chart of a method of performing a hand-off in accordance with the preferred embodiment of the present invention.

With reference to FIG. 5, a flow chart of a method of performing a hand-off in accordance with the preferred embodiment of the present invention begins with applying 502 power to apparatus in the wireless communication system 100 (FIG. 1). In response, all fixed communication units 102 (FIG. 1) synchronize 504 with the five-hundred Hz square wave master sync signal generated by the synchronization generator 426 (FIG. 4) and sent by the housekeeping bit of the DNICs 416 (FIG. 4) as described herein above.

In response to a call, a first fixed communication unit 102 (FIG. 1) establishes 506 a wireless link with a portable communication unit 120 (FIG. 1) on a channel herein defined as the "original channel." Because all the fixed communication units are synchronized with the five-hundred Hz master sync signal from the controller 104 (FIG. 4), the radio transmissions of the portable communication unit are also synchronized with the five-hundred Hz master sync signal from the controller 104. After linking with the portable communication unit 120, the fixed communication unit 102 reports a number identifying the original channel to the controller microcomputer 402 (FIG. 4). The controller microcomputer 402 then stores 508 the number identifying the original channel in the channel database 404 (FIG. 4).

The microcomputer 204 of the first fixed communication unit 102 (FIG. 2) periodically monitors 510 a received signal strength indication (RSSI) of signals transmitted by the portable communication unit 120 (FIG. 1). The microcomputer 204 does this by reading an output signal from the RSSI circuit 216 (FIG. 2). If in step 512 the microcomputer 204 finds the RSSI above a pre-determined minimum value, the microcomputer 204 continues to monitor 510 the RSSI. If, on the other hand, in step 512 the microcomputer 204 finds the RSSI below a pre-determined minimum value, the microcomputer 204 sends 516 a message over one of the digital connections 116 (FIG. 1) to the controller microcomputer 402 (FIG. 4), requesting the controller microcomputer 402 to hand-off the portable communication unit 120 to a fixed communication unit 102 better able to receive the portable communication unit 120. In response, the controller microcomputer 402 checks 520 the channel database 404 (FIG. 4) to determine whether any transceivers 202 (FIG. 2) are available in any of the fixed communication units 102 near the first fixed communication unit 102 to accept the call. If no transceivers 202 are available, a hand-off is not possible and the controller microcomputer 402 sends 522 a message back to the microcomputer 204 of the first fixed communication unit 102. The message instructs the microcomputer 204 to send a message to the portable communication unit 120 for generating an audible indication to inform a user that the user is going out of transmission range and should stop moving.

If, on the other hand, in step 520 the controller microcomputer 402 (FIG. 4) determines that there is at least one available adjacent transceiver 202 (FIG. 2), then the controller microcomputer 402 sends 524 a message to the microcomputer 204 (FIG. 2) of each fixed communication unit 102 (FIG. 1) near the first fixed communication unit 102 that has an available transceiver 202, the message identifying the portable communication unit 120 (FIG. 1) and commanding the microcomputer 204 to tune the available transceiver 202 to the original channel and monitor the RSSI resulting from transmissions received from the portable communication unit 120. In response, the microcomputer 204 first verifies 526 the identity of the portable communication unit 120 sending any receivable transmission, and if the identity matches the identity sent in the message from the controller microcomputer 402, then the microcomputer 204 reads and reports to the controller microcomputer 402 a value received from the RSSI circuit 216 (FIG. 2), provided that the value is above a predetermined threshold.

To allow time for all fixed communication units 102 (FIG. 1) to monitor transmissions and then report, the controller microcomputer 402 (FIG. 4) delays 528 before checking 530 to determine whether any fixed communication units 102 have responded. If there is at least one response, the controller microcomputer 402 then designates 532 the responding fixed communication unit 102 having the highest reported RSSI as the receiving fixed communication unit 102, and the flow continues to step 602 of FIG. 6. If, on the other hand, there is no response found in step 530, then the controller microcomputer 402 sends 522 a message back to the microcomputer 204 of the first fixed communication unit 102. The message instructs the microcomputer 204 to send a message to the portable communication unit 120 for generating an audible indication to inform the user that the user is going out of transmission range and should stop moving.

Figure 6:
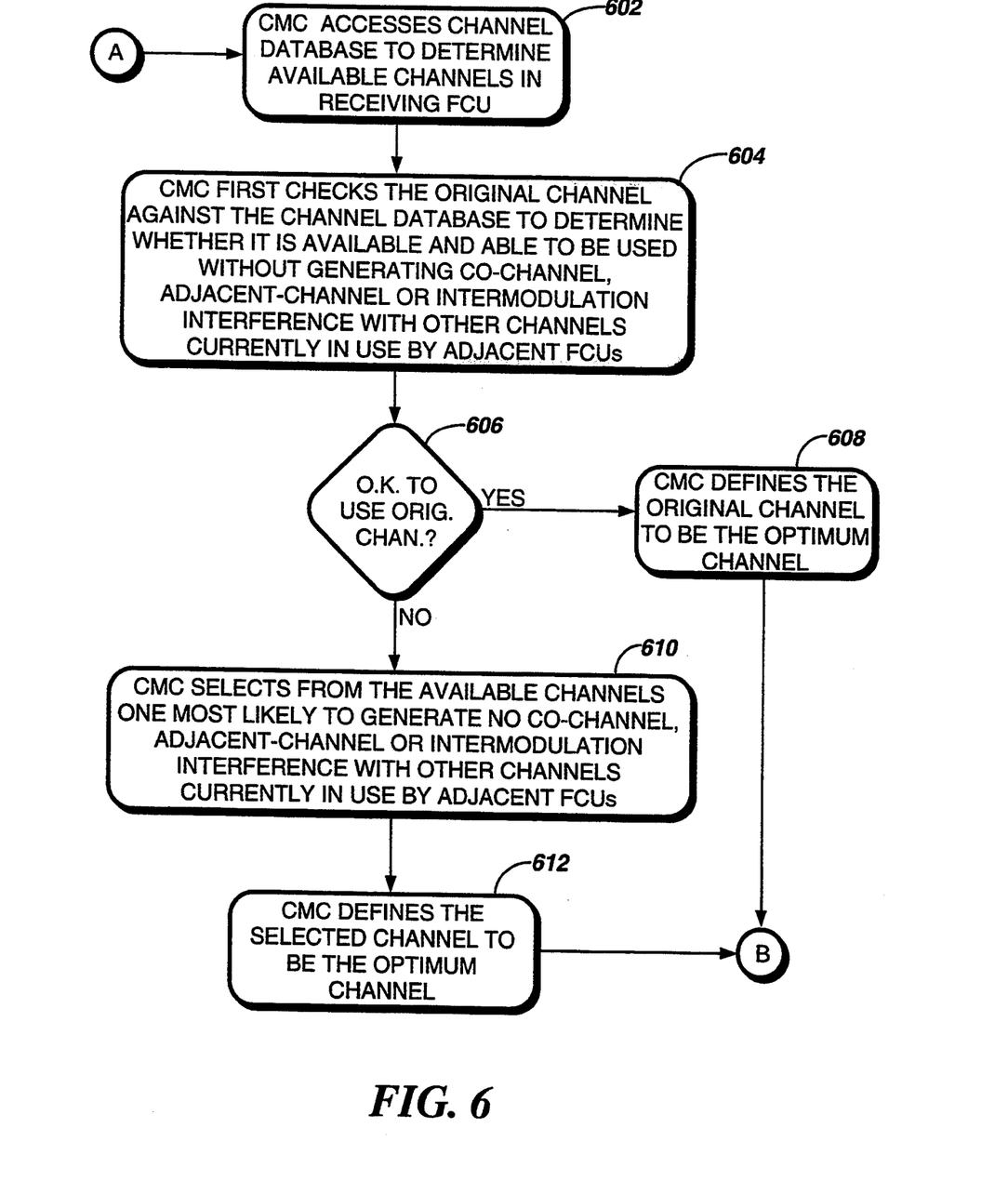

With reference to FIG. 6, the flow chart of a method of performing a hand-off in accordance with the preferred embodiment of the present invention continues with the controller microcomputer 402 (FIG. 4) accessing 602 the channel database 404 (FIG. 4) to determine what channels are available to the receiving fixed communication unit 102 (FIG. 1). In making the determination the controller microcomputer 402 first checks 604 whether the original channel can be used without generating or receiving co-channel, adjacent channel, or intermodulation interference with or from other channels currently in use by other fixed communication units 102 indicated by the channel database 404 to be physically near the receiving fixed communication unit 102. If in step 606 the controller microcomputer 402 determines that the original channel can be used, then the controller microcomputer 402 defines 608 the original channel to be the "optimum channel," and then the flow moves to step 702 of FIG. 7.

If, on the other hand, the controller microcomputer 402 (FIG. 4) determines in step 606 that the original channel cannot be used, then the controller microcomputer 402 uses the channel selector 406 (FIG. 4) to select 610 a channel that is most likely not to generate or receive co-channel, adjacent channel, or intermodulation interference with or from other channels currently in use by other fixed communication units 102 (FIG. 1) and indicated by the channel database 404 (FIG. 4) to be physically near the receiving fixed communication unit 102. Next, the controller microcomputer 402 defines 612 the selected channel to be the "optimum channel," and then the flow moves to step 702 of FIG. 7.

Figure 7:
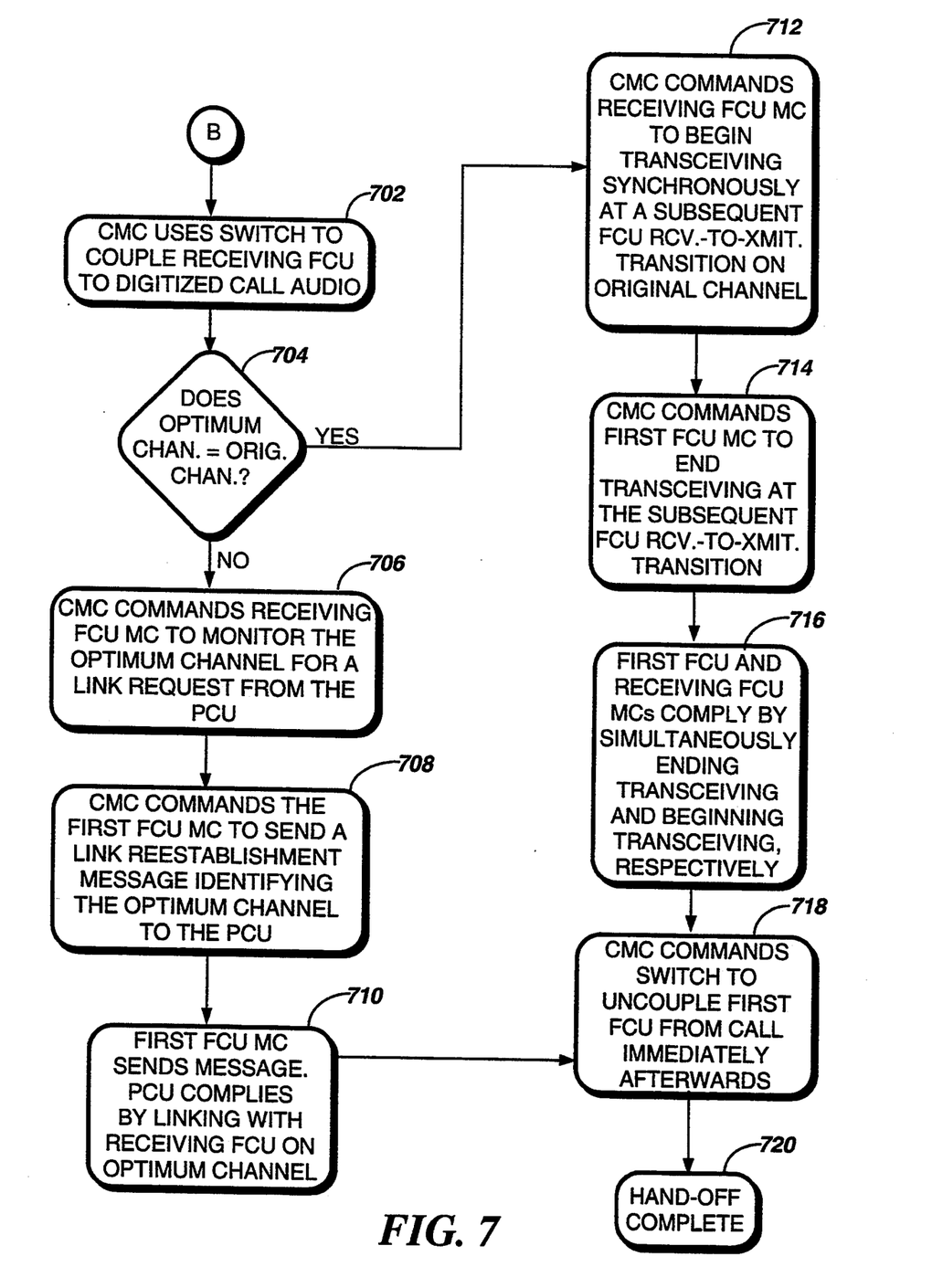

With reference to FIG. 7, the flow chart of a method of performing a hand-off in accordance with the preferred embodiment of the present invention continues with the controller microcomputer 402 (FIG. 4) commanding 702 the digital switch 418 (FIG. 4) to couple digitized audio of the call from the one of the CODECs 422 (FIG. 4) that is handling the call to the one of the DNICs 416 (FIG. 4) that is coupled to the receiving fixed communication unit 102. Next, the controller microcomputer 402 checks 704 whether it has defined the optimum channel to be the original channel.

If so, the controller microcomputer 402 commands 712 the microcomputer 204 (FIG. 2) of the receiving fixed communication unit 102 (FIG. 1) to control the receiving fixed communication unit 102 to begin transceiving synchronously with the portable communication unit 120 (FIG. 1) at a specified subsequent fixed communication unit receive-to-transmit transition on the original channel. Immediately thereafter, the controller microcomputer 402 also commands 714 the microcomputer 204 of the first fixed communication unit 102 to control the receiving fixed communication unit 102 to end transceiving with the portable communication unit 120 at the specified subsequent fixed communication unit receive-to-transmit transition. When the first fixed communication unit 102 and the receiving fixed communication unit 102 comply 716 by simultaneously ending and beginning, respectively, transceiving, a substantially seamless hand-off takes place. As a final action, the controller microcomputer 402 commands 718 the digital switch 418 to uncouple the first fixed communication unit 102 from the call, and the hand-off is complete 720.

The method in which the optimum channel is defined to be the original channel as just described in the preceding paragraph is preferred, because it produces a substantially seamless hand-off, i.e., a hand-off that substantially eliminates any gap in communications and thus is substantially unnoticeable to the user. Still, interference conditions sometimes make it impossible to define the optimum channel to be the original channel, and the method described in the following paragraph must be used.

If in step 704 the controller microcomputer 402 (FIG. 4) determines that it has not defined the original channel to be the optimum channel, then the controller microcomputer 402 commands 706 the microcomputer 204 (FIG. 2) of the receiving fixed communication unit 102 (FIG. 1) to control the receiving fixed communication unit 102 to monitor the optimum channel for a link request from the portable communication unit 120 (FIG. 1). Next, the controller microcomputer 402 commands 708 the microcomputer 204 of the first fixed communication unit 102 to send a link re-establishment message identifying the optimum channel to the portable communication unit 120. In response, the microcomputer 204 of the first fixed communication unit sends 710 the message to the portable communication unit 120 over the wireless link with the portable communication unit 120 on the original channel. The portable communication unit 120 complies with the message by linking with the receiving fixed communication unit 102 on the optimum channel. Then, as before, the controller microcomputer 402 commands 718 the digital switch 418 to uncouple the first fixed communication unit 102 from the call, and the hand-off is complete 720.

While the method of handing-off to a new channel as just described in the preceding paragraph does not produce the preferred substantially seamless hand-off possible when remaining on the original channel, the method does provide a hand-off having a communications gap of less than 300 milliseconds. In voice communications a hand-off gap of 300 milliseconds is considered barely noticeable, provided that the gap occurs infrequently, as is true for hand-off. In data communications there are many well-known retransmission techniques for recovering data lost during such brief gaps. Thus, the hand-off method according to the present invention advantageously provides a hand-off that is substantially seamless whenever possible, and very nearly seamless when conditions prevent the substantially seamless hand-off.

Figure 8:
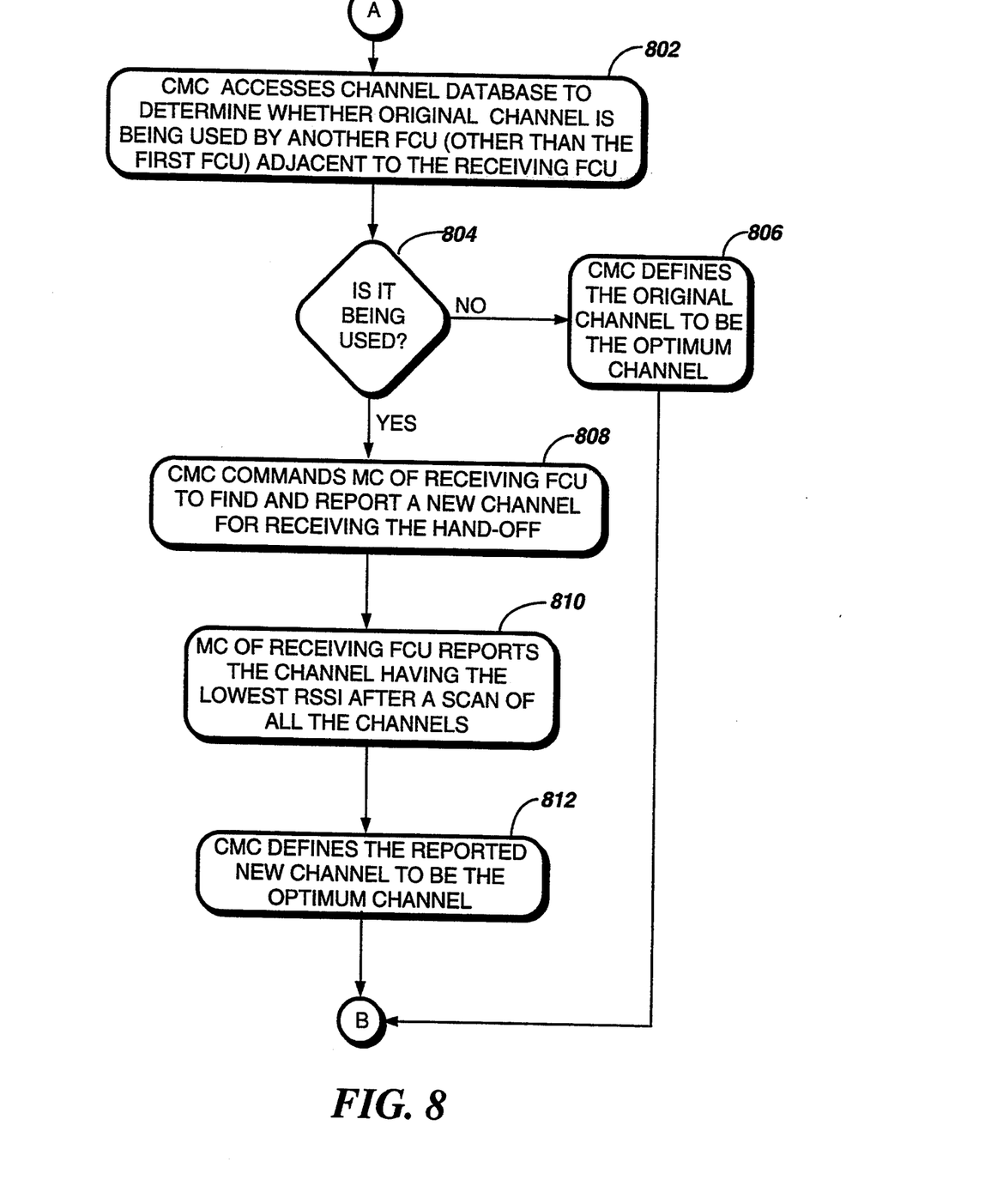
FIG. 8 is a flow chart of an alternate embodiment of the portion of the flow chart depicted in FIG. 6 in accordance with the present invention.

With reference to FIG. 8, a flow chart of an alternate embodiment of the portion of the flow chart depicted in FIG. 6 in accordance with the present invention begins with the controller microcomputer 402 (FIG. 4) accessing the channel database 404 (FIG. 4) to determine whether the original channel is being used by another fixed communication unit 102 (FIG. 1) (other than the first fixed communication unit 102) near the receiving fixed communication unit 102. If not 804, then the controller microcomputer 402 defines 806 the original channel to be the "optimum channel," and flow continues with step 702 of FIG. 7. If in step 804 the controller microcomputer 402 finds that the original channel is in use, then the controller microcomputer 402 commands 808 the microcomputer 204 (FIG. 2) of the receiving fixed communication unit 102 to find and report a new channel for receiving the hand-off. The microcomputer 204 controls the receiving fixed communication unit 102 to scan 810 all possible channels and report a new channel having the lowest RSSI. As a final step, the controller microcomputer 402 defines the reported new channel to be the "optimum channel," and flow continues with step 702 of FIG. 7.

Thus, the present invention provides a way of performing a hand-off in a CT2 system that allows confirmation of the source of a signal while synchronously monitoring the signal level to select the best fixed communication unit for receiving the hand-off. By maintaining a common synchronization among all fixed communication units and portable communication units in the system, the present invention allows any of the fixed communication units within receiving range to monitor communications from and even to begin transceiving with a portable communication unit to effect a hand-off while the portable communication unit is transceiving user data. It is impossible to do such monitoring and hand-off in a CT2 system without the present invention. This new ability enables a substantially seamless hand-off to occur when channel usage in nearby cells allows a call to remain on the original channel after the hand-off, and enables a nearly seamless hand-off to occur even when channel usage requires moving the call to a new channel.

We claim:

1. A method in a digital wireless communication system for controlling an inter-cell hand-off of a wireless link from a first fixed communication unit to a second fixed communication unit, the system comprising a portable communication unit and a controller coupled to the first and second fixed communication units, the method comprising the steps of:

(a) receiving by the first and second fixed communication units a common master synchronization signal from the controller;

(b) establishing a first wireless link between the first fixed communication unit and the portable communication unit on a first radio frequency,
wherein the first wireless link is synchronized to the common master synchronization signal, and
wherein frame synchronization is obtained between the fixed communication unit and the portable communication unit during establishment of the first wireless link;

(c) maintaining said frame synchronization by maintaining bit synchronization while transmitting user data on the first radio frequency, wherein no frame synchronization information is transmitted while transmitting said user data;

(d) establishing, under direction of the controller, a second wireless link between the second fixed communication unit and the portable communication unit, the second wireless link established on the first radio frequency in response to the first radio frequency having been determined by the system to be usable therebetween, the second wireless link being synchronized to the common master synchronization signal; and (e) disconnecting the first wireless link, after step (d), under direction of the controller, thereby seamlessly completing the inter-cell hand-off.

2. The method in accordance with claim 1, further comprising:

(f) commanding, by a link re-establishment message from the first fixed communication unit under direction of the controller, the portable communication unit to establish the second wireless link on a second radio frequency, thereby disconnecting the first wireless link, in response to the first radio frequency having been determined by the system to be unusable between the second fixed communication unit and the portable communication unit; and (g) establishing, after step (f), under direction of the controller, the second wireless link on the second radio frequency, the second wireless link being synchronized to the common master synchronization signal, thereby minimizing resynchronization time to effect a nearly seamless inter-cell hand-off.

3. The method in accordance with claim 2, further comprising in the second fixed communication unit the steps of:

(h) receiving from the controller a request to monitor transmissions from the portable communication unit on the first radio frequency;

(i) performing in response to step (h) synchronous monitoring of the transmissions from the portable communication unit on the first radio frequency, the synchronous monitoring being synchronized by the common master synchronization signal;

(j) measuring a received signal strength of the transmissions from the portable communication unit monitored synchronously in step (i); and (k) reporting to the controller the measured received signal strength in response to the measured received signal strength being greater than a predetermined amount.

4. The method in accordance with claim 2, further comprising in the first fixed communication unit the steps of:
(h) periodically monitoring received signal strength from the portable communication unit with which the first wireless link is established; and
(i) transmitting a hand-off request to the controller in response to determining in step (h) that the received signal strength is less than a predetermined level.

5. The method in accordance with claim 4, further comprising in the first fixed communication unit the steps of:
(j) receiving a hand-off denial message from the controller in response to step (i); and
(k) sending an audible indication to the portable communication unit in response to step (j).

6. The method in accordance with claim 2, further comprising in the second fixed communication unit the steps of:
(h) receiving from the controller a command to select a radio frequency for accepting the hand-off;
(i) measuring a received signal strength on a plurality of radio frequencies in response to step (h);
(j) selecting one of the plurality of radio frequencies measured in step (i) as having the lowest received signal strength; and
(k) identifying to the controller the radio frequency selected in step (j).

7. The method in accordance with claim 2, further comprising in the second fixed communication unit the steps of:
(h) monitoring a radio frequency identified by the controller for a link request from the portable communication unit, in response to the radio frequency identified being different from the first radio frequency; and (i) beginning radio transmissions at a specified subsequent fixed communication unit receive-to-transmit transition on the radio frequency identified by the controller, in response to the radio frequency identified being the first radio frequency.

8. The method in accordance with claim 2, further comprising in the controller the steps of:
(h) maintaining a current record of in-use radio frequencies and available radio frequencies for the first and second fixed communication units; and
(i) selecting from the available radio frequencies for the second fixed communication unit a radio frequency that minimizes interference with radio frequencies currently in use by the first fixed communication unit.

9. The method in accordance with claim 8, wherein step (i) comprises the steps of:
(j) avoiding radio frequencies currently in use by the first and second fixed communication units, except for the first radio frequency;
(k) avoiding radio frequencies adjacent to radio frequencies currently in use by the first and second fixed communication units; and
(l) avoiding radio frequencies that will produce interfering intermodulation products with radio frequencies currently in use by the first and second fixed communication units.

10. Apparatus for use in a digital wireless communication system for controlling an inter-cell hand-off of a wireless link from a first fixed communication unit to a second fixed communication unit, the system comprising a portable communication unit and a controller coupled to the first and second fixed communication units, the apparatus comprising:
first and second interface means for receiving, respectively, by the first and second fixed communication units a common master synchronization signal from the controller;
first wireless link establishment means in the first fixed communication unit, coupled to the first interface means, for establishing a first wireless link between the first fixed communication unit and the portable communication unit on a first radio frequency,
wherein the first wireless link is synchronized to the common master synchronization signal, and
wherein frame synchronization is obtained between the fixed communication unit and the portable communication unit during establishment of the first wireless link, and
wherein said frame synchronization is maintained by maintaining bit synchronization while transmitting user data, and
wherein no frame synchronization information is transmitted while transmitting said user data;
second wireless link establishment means in the second fixed communication unit, coupled to the second interface means, for establishing under direction of the controller a second wireless link between the second fixed communication unit and the portable communication unit, the second wireless link established on the first radio frequency in response to the first radio frequency having been determined by the system to be usable therebetween, the second wireless link being synchronized to the common master synchronization signal; and
first processor means in the first fixed communication unit coupled to the controller for disconnecting the first wireless link in response to establishment of the second wireless link on the first radio frequency, thereby seamlessly completing the inter-cell hand-off.

11. The apparatus in accordance with claim 10,
wherein the second wireless link establishment means commands, by a link re-establishment message from the first fixed communication unit under direction of the controller, the portable communication unit to establish the second wireless link on a second radio frequency, thereby disconnecting the first wireless link, in response to the first radio frequency having been determined by the system to be unusable between the second fixed communication unit and the portable communication unit, and
wherein the apparatus further comprises channel selector means coupled to the second wireless link establishment means for establishing, in response to the link re-establishment message, the second wireless link on the second radio frequency, the second wireless link being synchronized to the common master synchronization signal, thereby minimizing resynchronization time to effect a nearly seamless inter-cell hand-off.

12. The apparatus in accordance with claim 11,
wherein the second interface means receives from the controller a request to monitor transmissions from the portable communication unit on the first radio frequency; and wherein the apparatus further comprises in the second fixed communication unit:
- synchronizer means coupled to the second interface means for performing synchronous monitoring of the transmissions from the portable communication unit on the first radio frequency, the synchronous monitoring being synchronized by the common master synchronization signal;
- received signal strength measurement means coupled to the second wireless link establishment means for measuring a received signal strength of the transmissions from the portable communication unit monitored synchronously; and
- second processor means coupled to the received signal strength measurement means for reporting to the controller the measured received signal strength in response to the measured received signal strength being greater than a pre-determined amount.

13. The apparatus in accordance with claim 11,
wherein the apparatus further comprises in the first fixed communication unit a received signal strength measurement means coupled to the first wireless link establishment means for periodically monitoring received signal strength from the portable communication unit with which the first wireless link is established, and wherein the first processor means transmits a hand-off request to the controller in response to determining that the received signal strength is less than a pre-determined level.

14. The apparatus in accordance with claim 13,
wherein the first processor means receives a hand-off denial message from the controller in response to the hand-off request, and wherein the first processor means sends an audible indication to the portable communication unit in response to the hand-off denial message.

15. The apparatus in accordance with claim 11,
wherein the second interface means receives from the controller a command to select a radio frequency for accepting the hand-off, and wherein the apparatus further comprises in the second fixed communication unit a received signal strength measurement means coupled to the second wireless link establishment means for measuring a received signal strength on a plurality of radio frequencies in response to the command to select a radio frequency, and wherein the channel selector means selects one of the plurality of radio frequencies measured as having the lowest received signal strength, and wherein the second processor means identifies to the controller the radio frequency selected.

16. The apparatus in accordance with claim 11,
wherein the second wireless link establishment means monitors a radio frequency identified by the controller for a link request from the portable communication unit, in response to the radio frequency identified being different from the first radio frequency, and wherein the second wireless link establishment means begins radio transmissions at a specified subsequent fixed communication unit receive-to-transmit transition on the radio frequency identified by the controller, in response to the radio frequency identified being the first radio frequency.

17. The apparatus in accordance with claim 11,
wherein the controller comprises a channel database for maintaining a current record of in-use radio frequencies and available radio frequencies for the first and second fixed communication units, and wherein the channel selector means selects from the available radio frequencies for the second fixed communication unit a radio frequency that minimizes interference with radio frequencies currently in use by the first fixed communication unit.

18. The apparatus in accordance with claim 17,
wherein the channel selector means comprises:
- co-channel avoidance means for avoiding radio frequencies currently in use by the first and second fixed communication units, except for the first radio frequency;
- adjacent-channel avoidance means for avoiding radio frequencies adjacent to radio frequencies currently in use by the first and second fixed communication units; and
- intermodulation-channel avoidance means for avoiding radio frequencies that will produce interfering intermodulation products with radio frequencies currently in use by the first and second fixed communication units.

* * * * *